(12) United States Patent  (10) Patent No.: US 8,797,372 B2
Liu  (45) Date of Patent: Aug. 5, 2014

(54) DEVICE AND METHOD FOR CONTROLLING SCREEN BRIGHTNESS

(75) Inventor: Zhengrong Liu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 248 days.

(21) Appl. No.: 13/395,483

(22) PCT Filed: Jul. 20, 2010

(86) PCT No.: PCT/CN2010/075311
§ 371 (c)(1),
(2), (4) Date: Mar. 12, 2012

(87) PCT Pub. No.: WO2011/035641
PCT Pub. Date: Mar. 31, 2011

(65) Prior Publication Data
US 2012/0176420 A1  Jul. 12, 2012

(30) Foreign Application Priority Data
Sep. 28, 2009 (CN) .......................... 2009 1 0176074

(51) Int. Cl.
| | |
|---|---|
| *G09G 5/10* | (2006.01) |
| *H04N 5/58* | (2006.01) |
| *H04M 1/725* | (2006.01) |
| *H04N 21/431* | (2011.01) |
| *H04N 21/422* | (2011.01) |
| *G09G 3/34* | (2006.01) |

(52) U.S. Cl.
CPC ........... *H04N 5/58* (2013.01); *G09G 2360/144* (2013.01); *G09G 2320/0626* (2013.01); *G09G 5/10* (2013.01); *G09G 3/3406* (2013.01); *G09G 2320/0653* (2013.01); *H04M 1/72569* (2013.01); *H04N 21/4318* (2013.01); *H04N 21/42202* (2013.01)
USPC ................................. 345/690; 345/63; 345/77

(58) Field of Classification Search
CPC ................. G09G 3/36; G09G 3/3413; G09G 2320/0233; G09G 2320/0626; G09G 2320/0633; G09G 2320/066; G09G 5/10
USPC ........................... 345/63, 77, 84, 87, 102, 690
See application file for complete search history.

(56) References Cited

U.S. PATENT DOCUMENTS 5,406,305 A * 4/1995 Shimomura et al. .......... 345/102
5,952,992 A * 9/1999 Helms ............................ 345/102

(Continued)

FOREIGN PATENT DOCUMENTS

CN  1838751 A  9/2006
CN  101290762 A  10/2008

(Continued)

OTHER PUBLICATIONS

International Search Report (in Chinese with English translation) for PCT/CN2010/075311, mailed Nov. 4, 2010; ISA/CN.

*Primary Examiner* — Joe H Cheng
(74) *Attorney, Agent, or Firm* — Harness, Dickey & Pierce, PLC

(57) ABSTRACT

The present invention provides a device and method for controlling screen brightness. The method comprises: a light sensor acquiring a brightness signal intensity value of external environment and transmitting the brightness signal intensity value to a comparator; the comparator comparing the received brightness signal intensity value with a stored brightness signal intensity value and outputting a comparison result to an integrator; if the comparison result is that the received brightness signal intensity value is greater than the stored brightness signal intensity value, the integrator increasing the stored brightness signal intensity value by a fixed value according to the comparison result; and if the comparison result is that the received brightness signal intensity value is less than the stored brightness signal intensity value, the integrator decreasing the stored brightness signal intensity value by a fixed value according to the comparison result.

8 Claims, 2 Drawing Sheets

(56) References Cited

U.S. PATENT DOCUMENTS

| | | | |
|---|---|---|---|
| 6,094,185 A * | 7/2000 | Shirriff | 345/102 |
| 6,411,306 B1 * | 6/2002 | Miller et al. | 345/690 |
| 6,618,045 B1 * | 9/2003 | Lin | 345/207 |
| 6,710,763 B1 | 3/2004 | Iinuma | |
| 6,762,741 B2 * | 7/2004 | Weindorf | 345/102 |
| 6,865,405 B2 * | 3/2005 | Lin | 455/566 |
| 7,095,392 B2 * | 8/2006 | Lin | 345/87 |
| 7,236,154 B1 * | 6/2007 | Kerr et al. | 345/102 |
| 7,268,775 B1 * | 9/2007 | Gettemy | 345/204 |
| 7,928,955 B1 * | 4/2011 | Bell | 345/102 |
| 7,952,540 B2 * | 5/2011 | Lee | 345/76 |
| 8,514,242 B2 * | 8/2013 | Luengen et al. | 345/606 |
| 8,698,727 B2 * | 4/2014 | Herz et al. | 345/102 |
| 2002/0109664 A1 * | 8/2002 | Shimada | 345/102 |
| 2004/0000629 A1 * | 1/2004 | Lin | 250/205 |
| 2005/0117062 A1 * | 6/2005 | Chien et al. | 348/602 |
| 2005/0190142 A1 * | 9/2005 | Ferguson | 345/102 |
| 2006/0022934 A1 * | 2/2006 | Whitted et al. | 345/102 |
| 2006/0284824 A1 * | 12/2006 | Yeh | 345/102 |
| 2007/0040774 A1 * | 2/2007 | Lee et al. | 345/77 |
| 2008/0074361 A1 * | 3/2008 | Lee et al. | 345/77 |
| 2008/0094348 A1 * | 4/2008 | Yin et al. | 345/102 |
| 2008/0158138 A1 * | 7/2008 | Yamazaki et al. | 345/102 |
| 2008/0165203 A1 * | 7/2008 | Pantfoerder | 345/589 |
| 2009/0166510 A1 * | 7/2009 | Park et al. | 250/205 |
| 2009/0231440 A1 * | 9/2009 | Lai et al. | 348/207.1 |
| 2010/0060669 A1 * | 3/2010 | Cheng | 345/690 |
| 2010/0128010 A1 * | 5/2010 | Katoh et al. | 345/207 |
| 2010/0141571 A1 * | 6/2010 | Chiang et al. | 345/102 |
| 2010/0177029 A1 * | 7/2010 | Yeh | 345/102 |
| 2011/0205442 A1 * | 8/2011 | Mori et al. | 348/673 |
| 2011/0227966 A1 * | 9/2011 | Mori | 345/690 |

FOREIGN PATENT DOCUMENTS

| | | |
|---|---|---|
| EP | 0570037 A1 | 11/1993 |
| GB | 2285329 A | 7/1995 |

* cited by examiner

DEVICE AND METHOD FOR CONTROLLING SCREEN BRIGHTNESS

CROSS-REFERENCE TO RELATED APPLICATIONS

This application is a 371 U.S. National Stage of International Application No. PCT/CN2010/075311, filed 20 Jul., 2010, and claims priority to Chinese patent application No. 200910176074.X, filed Sep. 28, 2009, the disclosures of which are herein incorporated by reference in their entirety.

TECHNICAL FIELD

The present invention relates to the field of display control, and more especially, to a method and device for controlling screen brightness.

BACKGROUND OF THE RELATED ART

In order to avoid problems that a screen of a mobile phone can be seen clearly under strong light such as sun due to dimness of the screen and backlight of the screen of the mobile phone is too bright and too dazzling in dusky environments, a light sensor is added to the mobile phone to automatically change brightness of the backlight of the screen.

In the prior art, a specific implementation scheme in which the brightness of the screen of the mobile phone is varied with the change of the external brightness is described below.

The brightness of the external environment is detected to obtain an environment illumination brightness value to determine whether the obtained illumination brightness value is equal to the preceding obtained environment illumination brightness value. If the determination result is yes, the brightness of the screen of the mobile phone is maintained; otherwise, a processing unit determines whether the obtained environment illumination brightness value is greater than the preceding determined environment illumination brightness value. If the obtained environment illumination brightness value is greater than the preceding determined environment illumination brightness value, then the brightness of the screen of the mobile phone will be adjusted up. If the both determination results are negative, the brightness of the screen of the mobile phone will be adjusted down.

CONTENT OF THE INVENTION

In the prior art, when brightness of a screen of a mobile phone is adjusted, values input into a sensor will be processed directly in a linear following manner, or processed logarithmically. In areas where brightness of lights changes greatly, the screen brightness has to be adjusted constantly, resulting in too high current consumption.

The present invention provides a method and device for controlling screen brightness so as to solve the problem in the prior art that when the screen brightness changes with the external environment, the screen brightness has to be adjusted constantly in areas where brightness of lights changes greatly, resulting in too high current consumption.

In order to solve the aforementioned problem, the present invention provides a method for controlling screen brightness comprising:

a light sensor acquiring a brightness signal intensity value of external environment and transmitting the brightness signal intensity value to a comparator;

the comparator comparing the received brightness signal intensity value with a stored brightness signal intensity value and outputting a comparison result to an integrator;

if the comparison result is that the received brightness signal intensity value is greater than the stored brightness signal intensity value, the integrator increasing the stored brightness signal intensity value by a fixed value according to the comparison result; and if the comparison result is that the received brightness signal intensity value is less than the stored brightness signal intensity value, the integrator decreasing the stored brightness signal intensity value by a fixed value according to the comparison result;

wherein the stored brightness signal intensity value is used to control an electric current amplitude of the current screen brightness.

Preferably, before the step of the comparator outputting the comparison result to the integrator, the method further comprises:

sending the comparison result to a consecutive code detector, and if the consecutive code detector detects that at least two consecutive comparison results are that the received brightness signal intensity value is greater than the stored brightness signal intensity value, increasing the fixed value; if at least two consecutive comparison results are that the received brightness signal intensity value is less than the stored brightness signal intensity value, decreasing the fixed value.

Preferably, after the step of increasing or decreasing the stored brightness signal intensity value by the fixed value, the method further comprises:

comparing the brightness signal intensity value increased by the fixed value with a preset upper limit, and if the brightness signal strength value increased by the fixed value is greater than the upper limit, sending the upper limit as the current brightness signal intensity value to the comparator for storing and for controlling the electric current amplitude of the current screen brightness;

comparing the brightness signal intensity value decreased by the fixed value with a preset lower limit, and if the brightness signal strength value decreased by the fixed value is less than the lower limit, sending the lower limit as the current brightness signal intensity value to the comparator for storing and for controlling the electric current amplitude of the current screen brightness.

According to the method, the present invention also provides a device for controlling screen brightness comprising a light sensor, a comparator and an integrator, wherein the light sensor is configured to acquire a brightness signal intensity value of external environment and transmit the brightness signal intensity value to the comparator;

the comparator is configured to compare the received brightness signal intensity value with a stored brightness signal intensity value to obtain a comparison result; and the integrator is configured to receive the comparison result, and if the comparison result is that the received brightness signal intensity value is greater than the stored brightness signal intensity value, increase the stored brightness signal intensity value by a fixed value; and if the comparison result is that the received brightness signal intensity value is less than the stored brightness signal intensity value, decrease the stored brightness signal intensity value by a fixed value, the stored brightness signal strength value being used to control an electric current amplitude of the current screen brightness.

Preferably, the device also comprises a consecutive code detector and an amplitude adjuster, wherein:

the consecutive code detector is configured to receive the comparison result output by the comparator, and perform consecutive code detection on the comparison result, and send a consecutive code detection result to the amplitude adjuster; and the amplitude adjuster is configured to adjust the fixed value according to the consecutive code detection result, and send the adjusted fixed value to the integrator.

Preferably, the amplitude adjuster is configured to, if at least two consecutive comparison results are that the received brightness signal intensity value is greater than the stored brightness signal intensity value, increase the fixed value, and if at least two consecutive comparison results are that the received brightness signal intensity value is less than the stored brightness signal intensity value, decrease the fixed value.

Preferably, the device also comprises an amplitude limit controller.

The amplitude limit controller is configured to compare the brightness signal intensity value increased by the fixed value with a preset upper limit, if the brightness signal strength value increased by the fixed value output by the integrator is greater than the upper limit, use the upper limit to control the electric current amplitude of the current screen brightness, and send the upper limit as the current brightness signal intensity value to the comparator for storing; and compare the brightness signal intensity value decreased by the fixed value with a preset lower limit, if the brightness signal strength value decreased by the fixed value is less than the lower limit, use the lower limit to control the electric current amplitude of the current screen brightness, and send the lower limit as the current brightness signal intensity value to the comparator for storing.

In areas where brightness of lights fluctuates greatly, the method and device in accordance with the present invention allows a Liquid Crystal Display (LCD) screen to provide relatively stable screen brightness in the case that the ambient brightness is not stable, thus reducing the user's visual fatigue.

PREFERRED EMBODIMENTS OF THE PRESENT INVENTION

The embodiment of the present invention provides a method for controlling screen brightness comprising: a light sensor acquiring a brightness signal intensity value of external environment and transmitting the brightness signal intensity value to a comparator; the comparator comparing the received brightness signal intensity value with a stored brightness signal intensity value and outputting a comparison result to an integrator; if the comparison result is that the received brightness signal intensity value is greater than the stored brightness signal intensity value, the integrator increasing the stored brightness signal intensity value by a fixed value according to the comparison result; and if the comparison result is that the received brightness signal intensity value is less than the stored brightness signal intensity value, the integrator decreasing the stored brightness signal intensity value by a fixed value according to the comparison result; wherein the stored brightness signal intensity value is used to control an electric current amplitude of the current screen brightness.

The specific embodiments of the present invention will be described in detail below in conjunction with the accompanying drawings.

Figure 1:
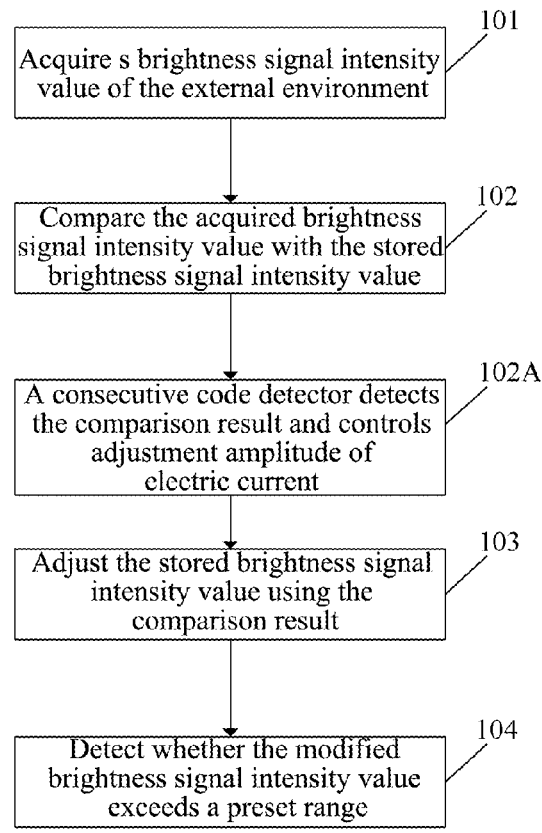
FIG. 1 is a flow chart of a method for controlling screen brightness in accordance with an embodiment of the present invention.

As shown in FIG. 1, a method for controlling screen brightness in accordance with an embodiment of the present invention specifically comprises the following step.

In step 101, a light sensor transmits an ambient brightness signal intensity value to a comparator.

In step 102, the comparator compares the brightness signal intensity value sent by the light sensor with its stored brightness signal intensity value to obtain a comparison result.

In step 103, the comparison result is used to adjust the stored brightness signal intensity value; and if the comparison result is that the received brightness signal intensity value is greater than the stored brightness signal intensity value, control information is sent to a integrator to increase the stored brightness signal intensity value by a fixed value, the stored brightness signal intensity value is also used to control the electric current amplitude of the current screen brightness; if the comparison result is that the received brightness signal intensity value is less than the stored brightness signal intensity value, control information is sent to the integrator to decrease the stored brightness signal intensity value by a fixed value.

The fixed value may be set according to actual applications automatically. If the fixed value is set to be 1, when the comparison result is that the received brightness signal intensity value is greater than the stored brightness signal intensity value, the brightness signal intensity value for controlling its stored electric current amplitude of the screen brightness is increased by 1; otherwise, it is decreased by 1.

In addition, in order to make the adjustment of the electric current not lag behind the change in the brightness of the external environment, in the embodiment of the present invention, before the comparator sends the control information to the integrator, the method further comprises step 102A.

In step 102A, the comparison result is sent to a consecutive code detector, and if at least two consecutive comparison results are that the received brightness signal intensity value is greater than the stored brightness signal intensity value, the fixed value is increased; if at least two consecutive comparison results are that the received brightness signal intensity value is less than the stored brightness signal intensity value, the fixed value is decreased.

In order to prevent the electric current of the screen brightness from being too high or too low, in the embodiment of the present invention, before the stored brightness signal intensity value is increased or decreased by a fixed value, the method further comprises step 104.

In step 104, the brightness signal intensity value increased by the fixed value is compared with a preset upper limit, if it is greater than the upper limit, then the upper limit is stored as the current brightness signal intensity value, and used to control the electric current amplitude of the current screen brightness; and the brightness signal intensity value decreased by the fixed value is compared with the preset lower limit, if it is less than the lower limit, the lower limit is stored as the current brightness signal intensity value, and used to control the electric current amplitude of the current screen brightness.

In the embodiment of the present invention, the comparison result that the received brightness signal intensity value is greater than the stored brightness signal intensity value is defined as active high, that is, an output of the comparator is defined as 1, indicating that the received brightness signal intensity value is less than the stored brightness signal intensity value, or defined as active low, that is, an output of the comparator is defined as 0.

The amplitude of the external signal has been greatly increased, that is, changing the magnitude of the fixed value can make an estimated value of the screen brightness catch up with the external change quickly, i.e., if the comparator consecutively outputs (two or more same outputs are regarded as consecutive outputs) numbers of "1" or "0", such as "11 . . . 1" or "00 . . . 0", it is shown that there is a relatively large change in the surrounding signal. The specific implementation will be described below.

The consecutive code detector (detect whether the same signals are output consecutively) detects whether there are consecutive outputs of 1 or 0, and if yes, outputs a control signal to adjust the fixed value. For example, when two consecutive "1 s" occur, the consecutive code detector is activated, and an amplitude control modulator adjusts the output amplitude (that is, to adjust the magnitude of the fixed value), e.g., increases the magnitude of the fixed value twice.

After the amplitude control modulator receives the control signal output by the consecutive code detector, it will control increase of the modulation amplitude (of a modulation amplitude signal) while sending control information to the integrator.

Since output of signals is periodic, there is a certain interval between an input signal and an output signal. Signals within the interval are invariant, that is, inconsecutive, thus the current signal can be compared with the preceding periodic signal to generate an estimated value of the current signal (that is, the result output after the stored brightness signal intensity value is increased or decreased by a fixed value will be stored). The estimated value is sent to the comparator as a comparison signal, or it may be output as a control signal controlling the electric current amplitude of the screen brightness.

The amplitude control modulator in this embodiment is an amplitude adjuster.

Figure 2:
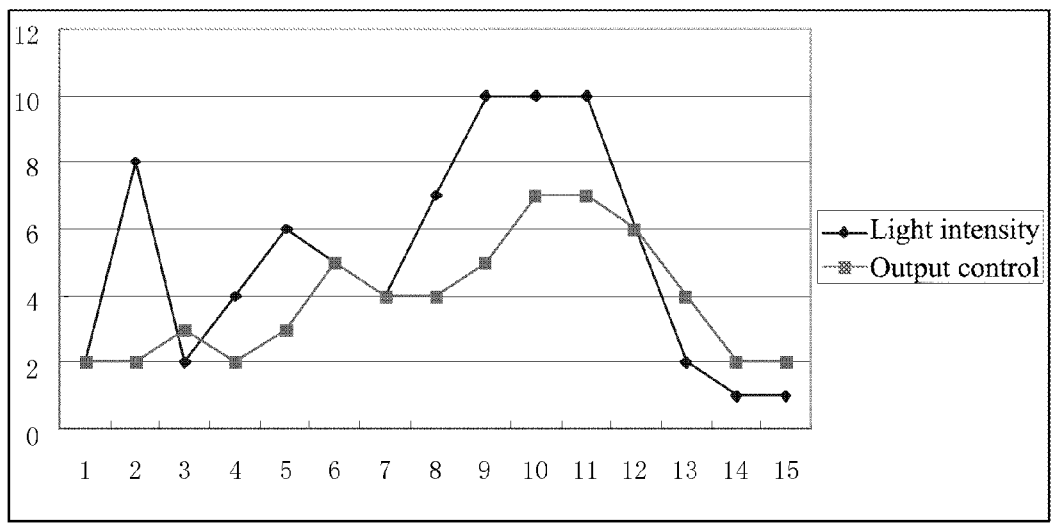
FIG. 2 is a schematic graph of brightness control using a method for controlling screen brightness in accordance with an embodiment of the present invention.

FIG. 2 is a simulating graph of change in light intensity in environments, in which the horizontal axis represents time with a unit being sampling period, and the vertical axis represents amplitude (input light brightness, and output signal amplitude controlling electric current). In order to prevent the electric current controlling the screen brightness from being too large or too low, in the embodiment of the present invention, the amplitude of the electric current is controlled to be a maximum of 7 and a minimum of 2. In addition, the preset amplitude of each increment is 1 (that is, the fixed value is 1).

A. In a period of time 0~3, the input brightness changes from 2 to 8, and then to 2. This brightness signal means that fluctuation in the surrounding environment is larger. In the prior art, the electric current controlling the screen brightness is adjusted directly based on the light brightness, whereas in the embodiment of the present invention, the original electric current is increased by a fixed value via a control device after comparison such that the unstable signal becomes a signal without great fluctuation, thus reducing the unnecessary waste of electric current.

B. In a period of time 3~7, the input brightness changes from 2 to 7. At the first stage of the control device, the output amplitude is increased by only 1 (initial value), but since the light brightness of the external environment at the second stage changes greatly, the output cannot reflect the change of the input timely, in the case that the consecutive code detector detects that control signals of 1 are continuously output, the amplitude modulator changes the adjustment amplitude increment to two, so as to reflect the change of the input signal timely.

C. In a period of time 7~10, the input brightness changes from 4 to 10. In the case that an output signal tracks the change of the external signal timely, the output signal is controlled by an amplitude control signal to control the maximum output to be 7, ensuring that the screen brightness is within the acceptable range, while reducing unnecessary power consumption.

D. In a period of time 10~14, the input brightness changes from 10 to 1 and is controlled by the amplitude control signal to control the minimum output to be 2, also ensuring a certain brightness in a dim environment.

Figure 3:
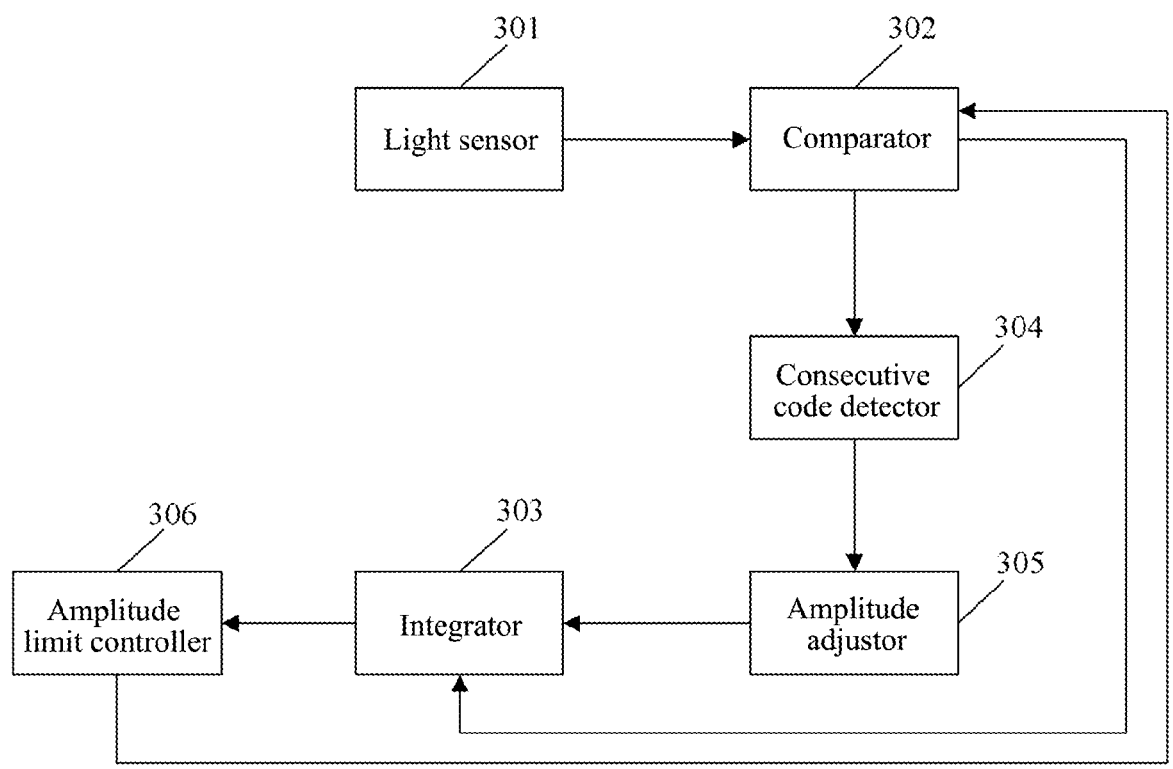
FIG. 3 is a block diagram of a device for controlling screen brightness in accordance with an embodiment the present invention.

As shown in FIG. 3, according to the method described above, an embodiment of the present invention also provides a device for controlling screen brightness specifically comprising a light sensor 301, a comparator 302 and an integrator 303.

The light sensor 301 is configured to acquire a brightness signal intensity value of external environment and transmit the brightness signal intensity value to the comparator.

The comparator 302 is configured to compare the received brightness signal intensity value with a stored brightness signal intensity value to obtain a comparison result.

The integrator 303 is configured to receive the comparison result, and if the comparison result is that the received brightness signal intensity value is greater than the stored brightness signal intensity value, increase the stored brightness signal intensity value by a fixed value; and if the comparison result is that the received brightness signal intensity value is less than the stored brightness signal intensity value, decrease the stored brightness signal intensity value by a fixed value.

The stored brightness signal strength value is used to control an electric current amplitude of the current screen brightness.

In addition, in order to make the adjustment of the electric current not lag behind the change in the brightness of the external environment, the device in accordance with the embodiment of the present invention also comprises a consecutive code detector 304 and an amplitude adjuster 305.

The consecutive code detector 304 is configured to receive the comparison result output by the comparator, and perform consecutive code detection on the comparison result, and send a consecutive code detection result to the amplitude adjuster 305.

The amplitude adjuster 305 is configured to adjust the fixed value according to the consecutive code detection result, wherein if at least two consecutive comparison results are that the received brightness signal intensity value is greater than the stored brightness signal intensity value, the fixed value is increased, and if at least two consecutive comparison results are that the received brightness signal intensity value is less than the stored brightness signal intensity value, the fixed value is decreased; and send the adjusted fixed value to the integrator 305.

Furthermore, in order to prevent the electric current controlling the screen brightness from being too high or too low, the device in accordance with the embodiment of the present invention also comprises an amplitude limit controller 306.

The amplitude limit controller 306 is configured to compare the brightness signal intensity value increased by the fixed value with a preset upper limit, if it is greater than the upper limit, use the upper limit to control the electric current amplitude of the current screen brightness, and send the upper limit as the current brightness signal intensity value to the comparator for storing; and compare the brightness signal intensity value decreased by the fixed value with a preset lower limit, if it is less than the lower limit, use the lower limit to control the electric current amplitude of the current screen brightness, and send the lower limit as the current brightness signal intensity value to the comparator for storing.

The method and device in accordance with the embodiments of the present invention allows the LCD screen to provide relatively stable screen brightness in the case that the ambient brightness is unstable to reduce the user's visual fatigue, while preventing large fluctuations of the screen current so as to reduce the electric current consumption, and keep coordination between the screen brightness and the surrounding environment in the case that the ambient brightness changes.

It may be understood by those skilled in the art that all or some of the steps in the described method can be implemented by related hardware instructed by programs which may be stored in computer readable storage mediums, such as read-only memory, disk or CD-ROM, etc. Alternatively, all or some of the steps in the embodiments described above may also be implemented using one or more integrated circuits. Accordingly, each module/unit in the embodiments described above may be implemented in a form of hardware, or software functional module. The present invention is not limited to combinations of hardware and software in any particular form.

The method in accordance with the present invention is not limited to the specific embodiments described above, and other embodiments obtained by those skilled in the art according to the technical scheme of the present invention also belong to the technological innovation scope of present invention. Obviously, various modifications and variations to the present invention may be made by those skilled in the art without departing from the spirit and scope of the present invention. Therefore, if all these modifications and variations are within the scope of the claims of the present invention and its equivalent technologies, the present invention is also intended to cover these modifications and variations.

INDUSTRIAL APPLICABILITY

The method and device in accordance with the embodiments of the present invention allows the LCD screen to provide relatively stable screen brightness in the case that the ambient brightness is unstable to reduce the user's visual fatigue, while preventing large fluctuations of the screen current so as to reduce the electric current consumption, and keep coordination between the screen brightness and the surrounding environment in the case that the ambient brightness changes.

What is claimed is:

1. A device for controlling screen brightness comprising a light sensor, a comparator and an integrator, wherein
the light sensor is configured to acquire a brightness signal intensity value of external environment and transmit the brightness signal intensity value to the comparator;
the comparator is configured to compare the received brightness signal intensity value with a stored brightness signal intensity value to obtain a comparison result; and
the integrator is configured to receive the comparison result, and if the comparison result is that the received brightness signal intensity value is greater than the stored brightness signal intensity value, increase the stored brightness signal intensity value by a fixed value; and if the comparison result is that the received brightness signal intensity value is less than the stored brightness signal intensity value, decrease the stored brightness signal intensity value by a fixed value, the stored brightness signal intensity value being used to control an electric current amplitude of the current screen brightness.

2. The device according to claim 1, further comprising a consecutive code detector and an amplitude adjuster, wherein:
the consecutive code detector is configured to receive the comparison result output by the comparator, and perform consecutive code detection on the comparison result, and send a consecutive code detection result to the amplitude adjuster; and
the amplitude adjuster is configured to adjust the fixed value according to the consecutive code detection result, and send the adjusted fixed value to the integrator.

3. The device according to claim 2, wherein the amplitude adjuster is configured to, if at least two consecutive comparison results are that the received brightness signal intensity value is greater than the stored brightness signal intensity value, increase the fixed value, and if at least two consecutive comparison results are that the received brightness signal intensity value is less than the stored brightness signal intensity value, decrease the fixed value.

4. The device according to claim 1, further comprising an amplitude limit controller, wherein
the amplitude limit controller is configured to compare the brightness signal intensity value increased by the fixed value with a preset upper limit, if the brightness signal intensity value increased by the fixed value output by the integrator is greater than the upper limit, use the upper limit to control the electric current amplitude of the current screen brightness, and send the upper limit as the current brightness signal intensity value to the comparator for storing; and compare the brightness signal intensity value decreased by the fixed value with a preset lower limit, if the brightness signal intensity value decreased by the fixed value is less than the lower limit, use the lower limit to control the electric current amplitude of the current screen brightness, and send the lower limit as the current brightness signal intensity value to the comparator for storing.

5. A method for controlling screen brightness comprising:
a light sensor acquiring a brightness signal intensity value of external environment and transmitting the brightness signal intensity value to a comparator;
the comparator comparing the received brightness signal intensity value with a stored brightness signal intensity value and outputting a comparison result to an integrator;
if the comparison result is that the received brightness signal intensity value is greater than the stored brightness signal intensity value, the integrator increasing the stored brightness signal intensity value by a fixed value according to the comparison result; and
if the comparison result is that the received brightness signal intensity value is less than the stored brightness signal intensity value, the integrator decreasing the stored brightness signal intensity value by a fixed value according to the comparison result;

wherein the stored brightness signal intensity value is used to control an electric current amplitude of the current screen brightness.

6. The method according to claim 5, wherein before the step of the comparator outputting the comparison result to the integrator, the method further comprises:

sending the comparison result to a consecutive code detector, and if the consecutive code detector detects that at least two consecutive comparison results are that the received brightness signal intensity value is greater than the stored brightness signal intensity value, increasing the fixed value; if at least two consecutive comparison results are that the received brightness signal intensity value is less than the stored brightness signal intensity value, decreasing the fixed value.

7. The method according to claim 6, wherein after the step of increasing or decreasing the stored brightness signal intensity value by the fixed value, the method further comprises:

comparing the brightness signal intensity value increased by the fixed value with a preset upper limit, and if the brightness signal intensity value increased by the fixed value is greater than the upper limit, sending the upper limit as the current brightness signal intensity value to the comparator for storing and for controlling the electric current amplitude of the current screen brightness; and comparing the brightness signal intensity value decreased by the fixed value with a preset lower limit, and if the brightness signal intensity value decreased by the fixed value is less than the lower limit, sending the lower limit as the current brightness signal intensity value to the comparator for storing and for controlling the electric current amplitude of the current screen brightness.

8. The method according to claim 5, wherein after the step of increasing or decreasing the stored brightness signal intensity value by the fixed value, the method further comprises:

comparing the brightness signal intensity value increased by the fixed value with a preset upper limit, and if the brightness signal intensity value increased by the fixed value is greater than the upper limit, sending the upper limit as the current brightness signal intensity value to the comparator for storing and for controlling the electric current amplitude of the current screen brightness; and comparing the brightness signal intensity value decreased by the fixed value with a preset lower limit, and if the brightness signal intensity value decreased by the fixed value is less than the lower limit, sending the lower limit as the current brightness signal intensity value to the comparator for storing and for controlling the electric current amplitude of the current screen brightness.

* * * * *